Oct. 1, 1957  M. J. GILMAN  2,808,093
FROZEN FOOD SHIPPING CONTAINERS
Filed March 10, 1954  2 Sheets-Sheet 1

INVENTOR
MARTIN J. GILMAN
BY
ATTORNEY

Oct. 1, 1957 M. J. GILMAN 2,808,093
FROZEN FOOD SHIPPING CONTAINERS
Filed March 10, 1954 2 Sheets-Sheet 2

INVENTOR
MARTIN J. GILMAN
BY
ATTORNEY

United States Patent Office 2,808,093
Patented Oct. 1, 1957

2,808,093

FROZEN FOOD SHIPPING CONTAINERS

Martin J. Gilman, Gilman, Conn.

Application March 10, 1954, Serial No. 415,226

3 Claims. (Cl. 150—52)

The present invention relates to frozen food shipping containers and more particularly to an insulated, reusable container adapted for delivery of frozen foods without any appreciable increase in the temperature of the frozen food during a normal delivery period.

Until recent years, it has been customary to transport perishable goods from one place to another by means of refrigerated freight cars or trucks. In more recent years, there has been a tremendous advance in the use of frozen food products and there has been a great problem created in transporting these frozen food products without spoiling. The problem is particularly acute when the shipping time is twenty-four hours or more. A particularly problem is to transport frozen foods safely and soundly from frozen food warehouses to chain stores or from chain store to a customer's deepfreeze at low cost without the use of refrigerated trucks. Although the use of refrigerated trucks is practical in densely populated areas involving large shipments, it becomes impractical for small shipments to outlying areas.

To overcome the aforesaid problems, the obvious solution is to provide refrigerated containers of relatively large size which can be carried by common carriers, or non-refrigerated trucks as an ordinary shipment or delivery.

While there has been numerous attempts made to construct flexible, collapsible containers for shipping frozen food products, these attempts have not been entirely successful either due to the failure of the container to stand up under the rough usage or to the failure of the insulating properties of the container.

According, a primary object of the present invention is to provide a flexible, insulated container so constructed as to prevent any appreciable rise in the temperature of the contained frozen food during a normal shipping period.

A further object of the present invention is to provide a lightweight, insulated container possessing considerable structural strength and being so designed as to assure long life even though constantly undergoing rough and repeated usage.

Further objects and advantages of the present invention will be readily apparent from the following detailed description taken in connection with the accompanying drawings, wherein.

Figure 1:
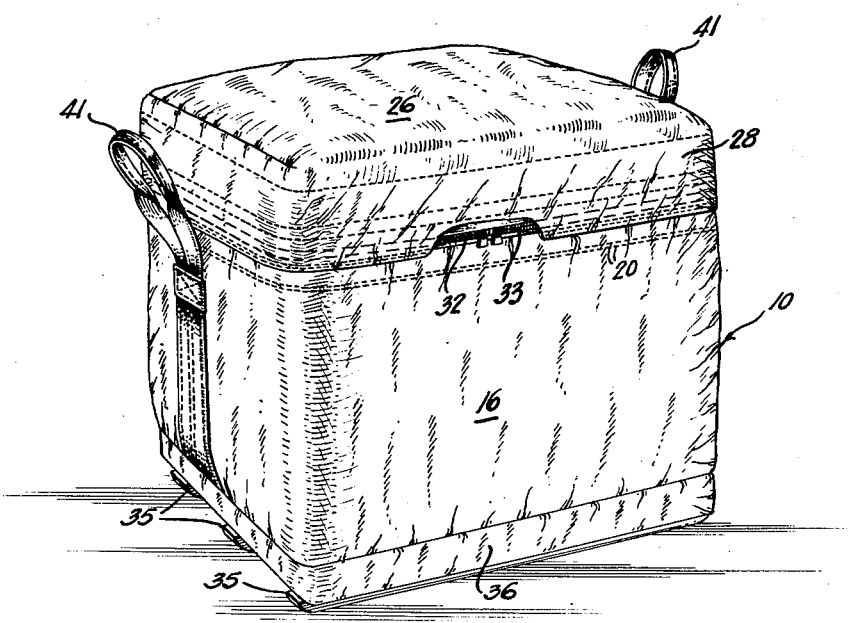
Figure 1 is an isometric view of the container forming the subject matter of the present invention.
Figure 2:
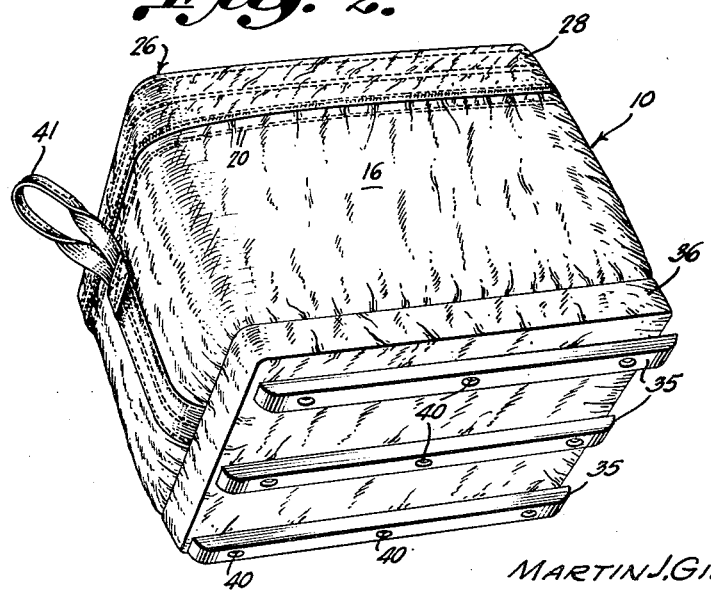
Figure 2 is a similar view with the containers tipped to show the bottom construction.

Referring to the drawings in detail, there is shown an insulated container generally indicated by the numeral 10. The flexible walls of the container are formed of neoprene coated nylon and has the following desirable qualities which makes it particularly adaptable for its present use. This material is fully waterproof, is mildew and fungus resistant, is resistant to abrasion, oil, sunlight, heat, cold, flame, fire and is tough and durable. The fabric is preferably of woven nylon of untwisted continuous yarns which are free to flatten out like miniature ribbons. This provides a finished fabric having good coverage but much lighter in weight than fabrics of a comparable density woven of twisted yarns. Although it has been found that neoprene coated fabric has the aforesaid desirable qualities, it will be clear that any suitable material which is waterproof, mildew, fungus and abrasion resistant, and of high strength can be used in place of neoprene coated material.

The receptacle part or inside of the container comprises a pair of spaced walls 11 and 12 formed of the neoprene coated nylon described above. The inner fabric is suitably stitched at 13, said line of stitching being covered by a strip of tape 14 cemented in place and of such width as to cover the stitched seam, thereby assuring a tight seam and insuring against any leakage through the perforations caused by the stitching. An insulating layer 15, formed of cotton batting faced with muslin, is positioned between the two spaced walls 11 and 12. Cotton is particularly desirable because it will not break down with constant flexing.

Figure 3:
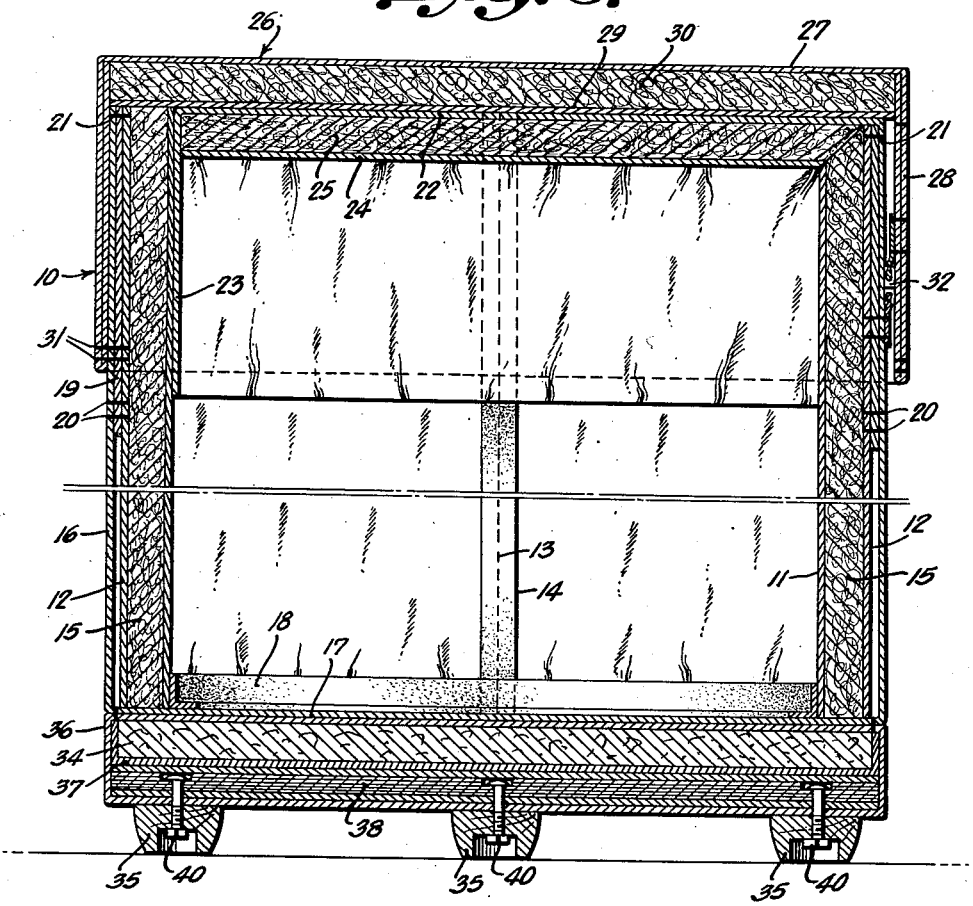
Figure 3 is a sectional view through the container.

The outer wall of the container includes the wall portion 16 and the bottom 17, said wall being also of neoprene-coated nylon. As seen in Figure 3, a tape 18 seals the joint between the inner wall 11 and the bottom wall 17. A reinforcing strip 19 is positioned between the upper sections of the outer wall 16 and the wall 12 and the three layers of material are stitched at points 20 and 21. The inner cover member 22 is shown as a continuation of one side of wall portion 16 and is provided at its free end with a tack-in flap 23. An inner spaced wall 24 forming an inner blanket is suitably attached to the cover member 22 and cotton insulation 25 is provided between wall 24 and cover member 22.

The outer cover 26 comprises the top wall 27 and depending flange portion 28. The flange portion is made of double thickness for added strength. The spaced wall 29 and layer of cotton insulation 30 completes the insulated portion of the outer cover. The outer cover is stitched to the outer container wall 16, by a double line of stitching 31 along a single wall only to form a hinge for the cover. The remaining three walls of the container and the cover are provided with "zipper" fasteners to hold the cover in place and to permit sealed shipment. The fasteners 32 and 33 are shown as being two in number to facilitate operation and are mounted above the lower edge of the cover flange, as seen in Figure 1, whereby the flange portion 28 normally covers the zipper to protect same against the elements and to provide increased insulation.

The base of the present container consists of a felt pad 34 of hard density and a plurality of replaceable skids 35, of hard wood. The felt pad 34 not only serves as insulation material but acts as a cushioning element. As pointed out above, cotton is preferred as the insulation medium but is inferior as a cushioning element for the reason that the weight of frozen food would cause the insulation to mat down and thus destroy the insulating value. The felt pad 34 is wholly enclosed within the cover member 36 and layer 37. The skids 35 not only serve as runners but protect the bottom of the container against abrasions due to skidding on concrete and while being shoved on or off trucks. A piece of plywood 38 is provided on the inside of the base as an anchoring means for the skids, and for added rigidity in the base. It will be understood that any rigid plate made of materials to withstand the stress of weight and handling can be used in place of the plywood shown. Two-ply material is used throughout the base for extra reinforcement and strength.

Figure 4:
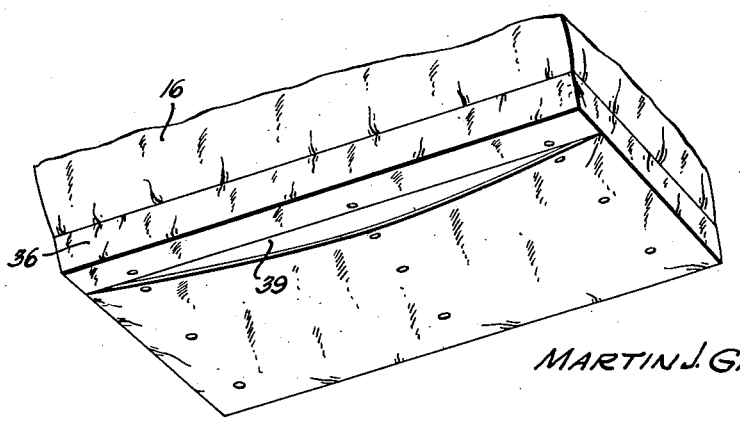
Figure 4 is a detailed view of a portion of the bottom construction.

As seen in Figure 4, the bottom wall of the cover member 36 has a slit 39 through which the felt pad and plywood board can be inserted and the slit kept closed by the bolts 40 which serve to anchor the skids 35 to the plywood board. Thus the skids can be installed without opening the interior of the container. Suitable handles 41 are stitched to the outer wall portion 16 of the container at opposite ends of the container.

To further increase the insulating value of the container, the outer wall of the container is coated with an aluminum paint. The aluminum coating serves to reflect the heat. In addition to the insulation feature, the aluminum finish improves the appearance of the container.

From the foregoing description, it will be apparent that the container of the present invention is so constructed as to insulate frozen foods carried therein from outside temperatures, thus protecting the food against deterioration during delivery in unrefrigerated carriers. The storage compartment is provided on all sides by layers of insulation and multiple layers of waterproof material thus greatly reducing the rate of heat entry into the storage compartment and permitting foods stored therein to be maintained at low temperatures for a period of time sufficient to permit easy delivery.

The container is relatively light in weight while retaining adequate strength and rigidity for the purpose for which it is designed. The exterior container protects the inner food container from rough handling, provides adequate structural strength, longer life and easier handling. Because of the improved construction, the container is capable of being reused many times. Because of the novel bottom construction, the skids can be replaced when worn or broken without affecting the remaining container structure.

While I have described a preferred embodiment of my invention, it will be understood that minor changes may be made in the construction of the container without departing from the spirit of the invention as defined in the appended claims.

Having thus described the invention, what is claimed is:

1. A frozen food insulated container comprising an inner container formed of spaced walls and including a bottom wall, insulating material disposed between the spaced walls, an outer wall formed of flexible material and stitched to the outer spaced wall of the inner container, a rigid base member spaced from the inner container by insulating material and secured to said outer wall, an insulated cover for said inner container, and an outer cover having an upper insulated wall, said outer cover extending below the insulated wall and forming flange portions, one of said portions joined to the outer wall to provide a hinge.

2. A frozen food insulated container comprising an inner container formed of spaced walls and including a bottom wall, insulating material disposed between the spaced walls, an outer wall formed of flexible material and stitched to the outer spaced wall of the inner container, said outer wall having a bottom wall, a tape adhesively secured to said bottom wall and the lower edge of the inner wall of the inner container, a rigid base member spaced from the inner container by insulating material and secured to said outer wall, an insulated cover for said inner container and an outer cover having an upper insulated wall, said outer cover extending below the insulated wall and forming flange portions, one of said portions joined to the outer wall to provide a hinge.

3. A frozen food insulated container comprising an inner container formed of spaced walls and including a bottom wall, insulating material disposed between the spaced walls, an outer wall formed of flexible material and stitched to the outer spaced wall of the inner container, a rigid base member spaced from the inner container by insulating material and secured to said outer wall, an insulated cover member for said inner container, said outer wall of said cover member having an extension thereon forming a tuck-in flap, and an outer cover having an upper insulated wall, said outer cover extending below the insulated wall and forming flange portions, one of said portions joined to the outer wall to provide a hinge, the remaining flange portions being secured to the outer wall by means of detachable fasteners.

References Cited in the file of this patent

UNITED STATES PATENTS

| | | |
|---|---|---|
| 955,733 | Winter | Apr. 19, 1910 |
| 1,594,358 | Dunn | Aug. 3, 1926 |
| 1,871,153 | Buchanan | Aug. 9, 1932 |
| 1,949,677 | Crawford | Mar. 6, 1934 |
| 1,986,780 | Loring | Jan. 1, 1935 |
| 2,212,618 | Rifkin | Aug. 27, 1940 |
| 2,500,534 | Fordon | Mar. 14, 1950 |